(12) United States Patent
Mu et al.

(10) Patent No.: US 9,287,803 B2
(45) Date of Patent: Mar. 15, 2016

(54) INVERTER FOR CONVERTING DIRECT CURRENT POWER INTO ALTERNATING CURRENT POWER AND DIRECT CURRENT BUS VOLTAGE REGULATING METHOD THEREOF AND APPLICATION USING THE SAME

(71) Applicants: FSP-Powerland Technology Inc., Nanjing (CN); FSP TECHNOLOGY INC., Taoyuan County (TW)

(72) Inventors: Jian-Guo Mu, Nanjing (CN); Chuan-Yun Wang, Nanjing (CN); Ming Xu, Nanjing (CN)

(73) Assignees: FSP-Powerland Technology Inc., Nanjing (CN); FSP TECHNOLOGY INC., Taoyuan (TW)

( * ) Notice: Subject to any disclaimer, the term of this patent is extended or adjusted under 35 U.S.C. 154(b) by 0 days.

(21) Appl. No.: 14/472,395

(22) Filed: Aug. 29, 2014

(65) Prior Publication Data
US 2015/0070956 A1    Mar. 12, 2015

(30) Foreign Application Priority Data

Sep. 9, 2013  (CN) .......................... 2013 1 0406115

(51) Int. Cl.
*H02M 7/5387*  (2007.01)
*H02M 3/335*   (2006.01)
(Continued)

(52) U.S. Cl.
CPC ........ *H02M 7/53871* (2013.01); *H02M 3/3376* (2013.01); *H02M 7/4826* (2013.01); *H02M 2001/007* (2013.01); *H02M 2001/0058* (2013.01)

(58) Field of Classification Search
CPC .................. H02M 7/53871; H02M 2001/007; H02M 2001/0058; H02M 1/36; H02M 7/4807; H02M 7/4826; H02M 3/3376; H02M 7/217
USPC ........... 363/89, 17, 21.03, 21.02, 37, 132, 25, 363/98
See application file for complete search history.

(56) References Cited

U.S. PATENT DOCUMENTS 5,594,163 A  *  1/1997  Suzuki ......................... 73/61.44
6,278,080 B1 *  8/2001  Moriguchi ........... B23K 9/1056
                                                219/130.1
(Continued)

FOREIGN PATENT DOCUMENTS

| CN | 201234142 | 5/2009 |
|---|---|---|
| CN | 101771348 | 7/2010 |
| CN | 101860041 | 10/2010 |

*Primary Examiner* — Jessica Han
*Assistant Examiner* — Demetries A Gibson
(74) *Attorney, Agent, or Firm* — Jianq Chyun IP Office

(57) ABSTRACT

An inverter and a direct current (DC) bus voltage regulating method thereof are provided. The inverter includes a resonant conversion circuit, an inverting circuit, a first control circuit and a second control circuit. The resonant conversion circuit receives a DC input voltage and converts the same into a DC bus voltage. The inverting circuit couples to the resonant conversion circuit, and configured to convert the DC bus voltage into an AC output voltage. The first control circuit is configured to control operations of the resonant conversion circuit, where the first control circuit calculates a best working voltage of the resonant conversion circuit based on the DC input voltage and a resonant frequency of the resonant conversion circuit. The second control circuit controls operations of the inverting circuit, where the second control circuit receives the best working voltage calculated by the first control circuit and regulates the DC bus voltage accordingly.

8 Claims, 4 Drawing Sheets

(51) Int. Cl.
 *H02M 7/48* (2007.01)
 *H02M 3/337* (2006.01)
 *H02M 1/00* (2007.01)

(56) References Cited

U.S. PATENT DOCUMENTS

| | | | | |
|---|---|---|---|---|
| 6,348,780 B1 * | 2/2002 | Grant | ............................ | 323/222 |
| 7,123,113 B1 * | 10/2006 | Brennan et al. | ................ | 331/158 |
| 8,310,197 B2 * | 11/2012 | Chen | ................... | H02P 21/0003 318/504 |
| 2008/0285316 A1 * | 11/2008 | Park | ........................ | H02M 1/15 363/50 |
| 2009/0152954 A1 * | 6/2009 | Le et al. | ......................... | 307/110 |
| 2011/0181196 A1 * | 7/2011 | Kang et al. | .................... | 315/246 |
| 2011/0227407 A1 * | 9/2011 | Ransom | ................... | B60L 3/00 307/9.1 |

\* cited by examiner

INVERTER FOR CONVERTING DIRECT CURRENT POWER INTO ALTERNATING CURRENT POWER AND DIRECT CURRENT BUS VOLTAGE REGULATING METHOD THEREOF AND APPLICATION USING THE SAME

CROSS-REFERENCE TO RELATED APPLICATION

This application claims the priority benefit of China application serial no. 201310406115.6, filed on Sep. 9, 2013. The entirety of the above-mentioned patent application is hereby incorporated by reference herein and made a part of this specification.

BACKGROUND

1. Technical Field

The invention relates to a power conversion technique. Particularly, the invention relates to an inverter and a direct current bus voltage regulating method thereof.

2. Related Art

In design of a general inverter, a basic condition for implementing a normal operation of the inverter is that an amplitude of a direct current (DC) bus voltage is not smaller than a peak of an alternating current (AC) output voltage. In other words, regarding the inverter adopting a multistage conversion circuit configuration, especially a two-stage inverter composed of a DC-DC conversion circuit and an inverting circuit, in order to ensure a normal operation of the inverter, a power conversion operation performed by the DC-DC conversion circuit of the previous stage has to be sufficient to make the output DC bus voltage to be complied with the aforementioned condition.

To achieve a basic requirement of the above design, a designer generally designs the inverter by stably controlling the DC bus voltage to a constant voltage value. However, since a magnitude of the DC bus voltage is actually varied along with variation of a DC input voltage received by the DC-DC conversion circuit, in some applications (for example, a photovoltaic grid-connected system), it is not easy to maintain the DC bus voltage stable.

Moreover, if only the DC bus voltage is designed to the constant voltage value, the inverter may have low conversion efficiency when the constant voltage value is far greater than the DC bus voltage required by the post-stage inverting circuit.

SUMMARY

The invention is directed to an inverter and a direct current (DC) bus voltage regulating method thereof, which is capable of providing a stable DC bus voltage capable of being dynamically adjusted, so as to improve conversion efficiency.

The invention provides an inverter including a resonant conversion circuit, an inverting circuit, a first control circuit and a second control circuit. The resonant conversion circuit receives a DC input voltage, and converts the DC input voltage into a DC bus voltage. The inverting circuit is coupled to the resonant conversion circuit, and is configured to convert the DC bus voltage into an AC output voltage. The first control circuit is configured to control operations of the resonant conversion circuit, where the first control circuit calculates a best working voltage of the resonant conversion circuit based on the DC input voltage and a resonant frequency of the resonant conversion circuit. The second control circuit is configured to control operations of the inverting circuit, where the second control circuit receives the best working voltage calculated by the first control circuit, and controls the inverting circuit to regulate the DC bus voltage accordingly.

In an embodiment of the invention, the first control circuit regulates the DC input voltage by using a hysteresis control means, and accordingly generates a hysteresis regulation voltage, where the first control circuit calculates the best working voltage according to the hysteresis regulation voltage and a gain of the resonant conversion circuit on the resonant frequency.

In an embodiment of the invention, when the DC input voltage is increased, the first control circuit increases the hysteresis regulation voltage stepwise along a first characteristic curve, and when the DC input voltage is decreased, the first control circuit decreases the hysteresis regulation voltage stepwise along a second characteristic curve, where at least one hysteresis loop is formed between the first characteristic curve and the second characteristic curve.

In an embodiment of the invention, the second control circuit detects a magnitude of the AC output voltage, and calculates a normal working voltage required for maintaining a normal operation of the inverting circuit.

In an embodiment of the invention, one of the first control circuit and the second control circuit compares the best working voltage and the normal working voltage, and the second control circuit regulates the DC bus voltage to one of the best working voltage and the normal working voltage according to a comparison result.

In an embodiment of the invention, when the best working voltage is greater than the normal working voltage, the second control circuit controls the inverting circuit to regulate the input DC bus voltage to the best working voltage, and when the best working voltage is smaller than or equal to the normal working voltage, the second control circuit controls the inverting circuit to regulate the input DC bus voltage to the normal working voltage.

The invention provides a DC bus voltage regulating method for regulating a DC bus voltage generated by an inverter, which includes following steps. A resonant conversion circuit is used to receive a DC input voltage. A best working voltage of the resonant conversion circuit is calculated based on the DC input voltage and a resonant frequency of the resonant conversion circuit. An inverting circuit is used to regulate a DC bus voltage according to the best working voltage.

In an embodiment of the invention, the step of calculating the best working voltage of the resonant conversion circuit based on the DC input voltage and the resonant frequency of the resonant conversion circuit includes following steps. The DC input voltage is regulated by using a hysteresis control means, and a hysteresis regulation voltage is accordingly generated. The best working voltage is calculated according to the hysteresis regulation voltage and a gain of the resonant conversion circuit on the resonant frequency.

In an embodiment of the invention, the step of regulating the DC input voltage by using the hysteresis control means and accordingly generating the hysteresis regulation voltage comprises following steps. When the DC input voltage is increased, the hysteresis regulation voltage is increased stepwise along a first characteristic curve, and when the DC input voltage is decreased, the hysteresis regulation voltage is decreased stepwise along a second characteristic curve, where at least one hysteresis loop is formed between the first characteristic curve and the second characteristic curve.

In an embodiment of the invention, the DC bus voltage regulating method of the inverter further includes following steps. The AC output voltage is detected. A normal working voltage required for maintaining a normal operation of the inverting circuit is calculated according to the AC output voltage.

In an embodiment of the invention, the step of regulating the DC bus voltage according to the best working voltage includes following steps. The best working voltage and the normal working voltage are compared. The DC bus voltage is regulated to one of the best working voltage and the normal working voltage according to a comparison result.

In an embodiment of the invention, the step of regulating the DC bus voltage to one of the best working voltage and the normal working voltage according to the comparison result includes following steps. When the best working voltage is greater than the normal working voltage, the DC bus voltage is regulated to the best working voltage, and when the best working voltage is smaller than or equal to the normal working voltage, the DC bus voltage is regulated to the normal working voltage.

According to the above descriptions, the embodiment of the invention provides an inverter a DC bus voltage regulating method thereof. The inverter regulates the DC input voltage by using the hysteresis control means, such that the resonant conversion circuit of the inverter does not influence the voltage value of the generated DC bus voltage along with a disturbance or a tiny variation of the DC input voltage, so as to improve stability of DC-AC conversion of the post-stage inverting circuit.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
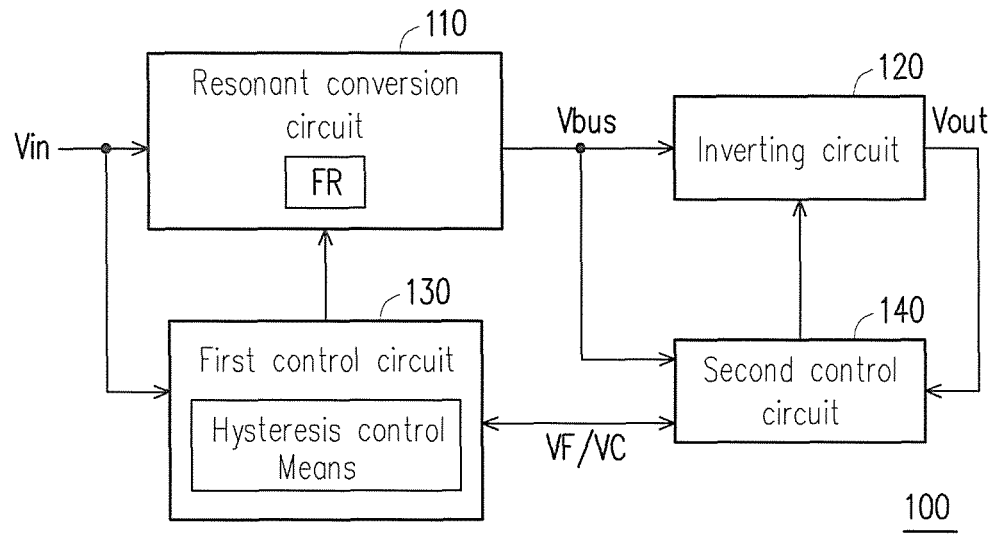
FIG. 1 is a schematic diagram of an inverter according to an embodiment of the invention.

Embodiments of the invention provide an inverter a DC bus voltage regulating method thereof. The inverter regulates a DC input voltage by using a hysteresis control means, such that the resonant conversion circuit of the inverter does not influence a voltage value of a generated DC bus voltage along with a disturbance or a tiny variation of the DC input voltage, so as to improve stability of DC-AC conversion of the post-stage inverting circuit. Reference will now be made in detail to the present preferred embodiments of the invention, examples of which are illustrated in the accompanying drawings. Wherever possible, the same reference numbers are used in the drawings and the description to refer to the same or like parts.

FIG. 1 is a schematic diagram of an inverter according to an embodiment of the invention. Referring to FIG. 1, the inverter 100 of the present embodiment includes a resonant conversion circuit 110, an inverting circuit 120, a first control circuit 130 and a second control circuit 140.

The resonant conversion circuit 110 receives a DC input voltage Vin, and converts the DC input voltage Vin into a DC bus voltage Vbus. The inverting circuit 120 is coupled to the resonant conversion circuit 110, and is configured to convert the DC bus voltage Vbus into an AC output voltage Vout. The first control circuit 130 and the second control circuit 140 are respectively configured to turn-on/turn-off a switching operation and a circuit protection mechanism (for example, over voltage protection, over current protection and over load protection) of the resonant conversion circuit 110 and the inverting circuit 120, so as to respectively control a power conversion operation of the resonant conversion circuit 110 and the inverting circuit 120.

In the present embodiment, the first control circuit 130 samples the input voltage Vin, and regulates the same into a hysteresis regulation voltage Vh (which is further described in following embodiments), and convert the hysteresis regulation voltage Vh into a best working voltage VF according to a gain of the resonant conversion circuit 110 in a best working state (i.e. operated in a resonant frequency). In other words, the first control circuit 130 calculates the best working voltage VF of the resonant conversion circuit 110 based on the DC input voltage Vin and the resonant frequency FR of the resonant conversion circuit 110. The second control circuit 140 receives the best working voltage VF provided by the first control circuit 130, and controls the inverting circuit 120 to regulate an input voltage thereof (i.e. the DC bus voltage Vbus) into the best working voltage VF in case of a suitable operating condition, so as to achieve better conversion efficiency of the resonant conversion circuit 110 and the inverter 100.

In the present embodiment, the first control circuit 130 samples the DC input voltage Vin, and regulates the DC input voltage Vin to generate the hysteresis regulation voltage Vh by using a hysteresis control means, and calculates the best working voltage VF according to the generated hysteresis regulation voltage Vh and the resonant frequency FR of the resonant conversion circuit 110, and then provides the calculated best working voltage VF to the second control circuit 140. Since the hysteresis regulation voltage Vh regulated by the hysteresis control means is not obviously varied along with disturbance or tiny variation of the DC input voltage Vin, the best working voltage VF calculated by the first control circuit 130 is relatively stable. Therefore, the second control circuit 140 can control the inverting circuit 120 to regulate a magnitude of the input voltage thereof (i.e. the DC bus voltage Vbus) according to the stable best working voltage VF, such that the resonant conversion circuit 110 is controlled to generate the stable DC bus voltage Vbus for providing to the inverting circuit 120.

Figure 2:
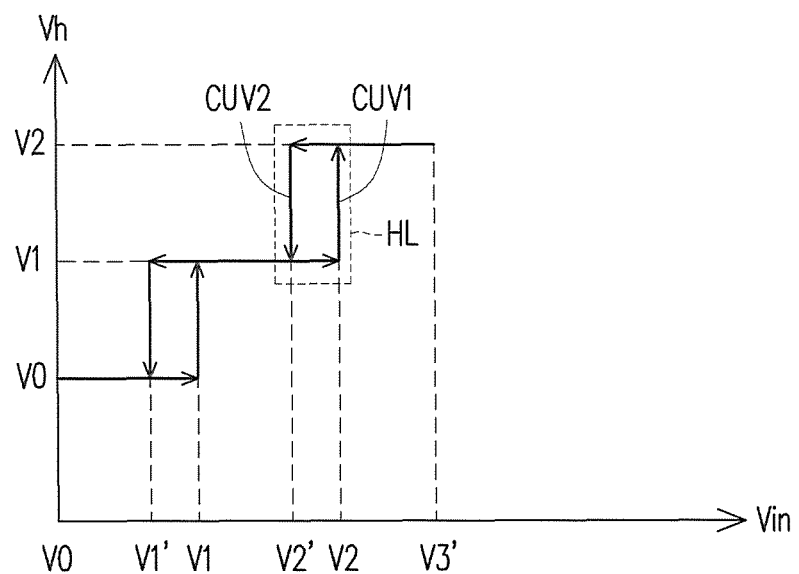
FIG. 2 is a schematic diagram illustrating a relative relationship between a hysteresis regulation voltage and a DC input voltage.

The method of regulating the DC input voltage Vin by using the hysteresis control means is described below with reference of FIG. 2, and FIG. 2 is a schematic diagram illustrating a relative relationship between the hysteresis regulation voltage Vh and the DC input voltage Vin.

Referring to FIG. 1 and FIG. 2, in the present embodiment, the first control circuit 130 adjusts the voltage value of the hysteresis regulation voltage Vh stepwise according to variation of the DC input voltage Vin, such that the hysteresis regulation voltage Vh is adjusted along different characteristic curves when the DC input voltage Vin is increased/decreased, so as to create a hysteresis loop on each voltage bit step to bear the disturbance of the DC input voltage Vin.

In detail, when the DC input voltage Vin is increased, the first control circuit 130 increases the hysteresis regulation voltage Vh stepwise along a first characteristic curve CUV1. For example, when the DC input voltage Vin is increased from a voltage value V0 to a voltage value V1, the hysteresis regulation voltage Vh is accordingly increased from the voltage value V0 to the voltage value V1, though if the DC input voltage Vin is only increased from the voltage value V0 to a voltage value VP, the hysteresis regulation voltage Vh is maintained to the voltage value V0. Similarly, when the DC input voltage Vin is increased from the voltage value V1 to a voltage value V2, the hysteresis regulation voltage Vh is accordingly increased from the voltage value V1 to the voltage value V2, otherwise, the hysteresis regulation voltage Vh is maintained to the voltage value V1.

On the other hand, when the DC input voltage Vin is decreased, the first control circuit 130 decreases the hysteresis regulation voltage Vh stepwise along a second characteristic curve CUV2. For example, when the DC input voltage Vin is decreased from a voltage value V3' to a voltage value V2', the hysteresis regulation voltage Vh is accordingly decreased from the voltage value V2 to the voltage value V1, though if the DC input voltage Vin is only increased from the voltage value V3' to the voltage value V2, the hysteresis regulation voltage Vh is maintained to the voltage value V2. Similarly, when the DC input voltage Vin is increased from the voltage value V2' to the voltage value V1', the hysteresis regulation voltage Vh is accordingly increased from the voltage value V1 to the voltage value V0, otherwise, the hysteresis regulation voltage Vh is maintained to the voltage value V1.

To be more specific, the first characteristic curve CUV1 and the second characteristic curve CUV2 do not coincide within a specific voltage section, so as to form a hysteresis loop HL between the first characteristic curve CUV1 and the second characteristic curve CUV2. Within the hysteresis loop HL, variation of the DC input voltage Vin is influenced by the hysteresis loop HL, and does not immediately causes variation of the hysteresis regulation voltage Vh.

For example, when the DC input voltage Vin is varied to increase the hysteresis regulation voltage Vh from the voltage value V1 to the voltage value V2, even if the DC input voltage Vin is suddenly decreased slightly to be lower than the voltage value V2 (though it is not lower than the voltage value V2') afterwards, the first control circuit 130 still maintains the hysteresis regulation voltage Vh to the voltage value V2 based on the second characteristic curve CUV2 rather than immediately decreases the hysteresis regulation voltage Vh from the voltage value V2 to the voltage value V1 along the first characteristic curve CUV1. Similarly, when the DC input voltage Vin is varied to decrease the hysteresis regulation voltage Vh from the voltage value V2 to the voltage value V1, even if the DC input voltage Vin is suddenly increased slightly to be higher than the voltage value V2' (though it is not lower than the voltage value V2) afterwards, the first control circuit 130 still maintains the hysteresis regulation voltage Vh to the voltage value V1 based on the first characteristic curve CUV1 rather than immediately increases the hysteresis regulation voltage Vh from the voltage value V1 to the voltage value V2 along the second characteristic curve CUV2.

Based on the above characteristic of hysteresis control, the first control circuit 130 can calculate the best working voltage VF according to the hysteresis regulation voltage Vh that is not influenced by disturbance or tiny variation of the DC input voltage Vin, and provides the calculated best working voltage VF to the second control circuit 140. Therefore, the post-stage inverting circuit 120 can control the resonant conversion circuit 110 to generate the stable DC bus voltage Vbus according to the relatively stable best working voltage VF.

It should be noticed that in the inverter 100 of the present embodiment, although the two control circuits 130 and 140 are used to respectively control the resonant conversion circuit 110 and the inverting circuit 120, in other embodiments, the first control circuit 130 and the second control circuit 140 can also be integrated as a same control circuit or integrated into a control chip, which is not limited by the invention. Moreover, the first control circuit 130 and the second control circuit 140 can be respectively configured in the resonant conversion circuit 110 and the inverting circuit 120, or independently configured in the inverter 100, which is not limited by the invention.

Moreover, in the present embodiment of the invention, the calculation step of the first control circuit 130 can also be implemented in the second control circuit 140, for example, the step of calculating the best working voltage VF can be implemented by the second control circuit 140, and in case of such implementation, the first control circuit 130 provides a reference value of the input voltage Vin to the second control circuit 140.

Besides, in some working conditions, if only the DC bus voltage is regulated to the best working voltage VF, normal operation of the inverter 100 probably cannot be ensured. Therefore, in the inverter 100 of the present embodiment, under a premise of ensuring the post-stage inverting circuit 120 to provide the rated AC output voltage Vout, a DC bus voltage regulating mechanism of making the resonant conversion circuit 110 to work around a resonant point as far as possible is further provided, so as to decrease a frequency modulation width of the resonant conversion circuit 110 to improve the conversion efficiency of the inverter 100.

In detail, in the inverter 100 of the present embodiment, besides that the first control circuit 130 can be used to calculate the best working voltage VF of the resonant conversion circuit 110 (i.e. the DC bus voltage Vbus making the resonant conversion circuit 110 to work in the resonant frequency), the second control circuit 140 can also be used to detect a magnitude of the AC output voltage Vout, and accordingly calculate a normal working voltage VC required for maintaining a normal operation of the inverting circuit 120. The second control circuit 140 can receive the best working voltage VF calculated by the first control circuit 130, and compares the best working voltage VF with the normal working voltage VC, such that the inverting circuit 120 selects one of the best working voltage VF and the normal working voltage VC to serve as a reference for regulating the DC bus voltage according to the comparison result.

For example, if the second control circuit 140 determines that the voltage value of the best working voltage VF is greater than the normal working voltage VC, it represents that even if the resonant conversion circuit 110 is now controlled to operate under the resonant frequency, the post-stage inverting circuit 120 can still normally operate. Therefore, in this case, the second control circuit 140 controls the input voltage of the post-stage inverting circuit 120 according to the best working voltage VF, such that the DC bus voltage Vbus output by the resonant conversion circuit 110 is the best working voltage VF, so as to achieve the maximum conversion efficiency of the inverter 100.

Conversely, if the second control circuit 140 determines that the best working voltage VF is smaller than or equal to the normal working voltage VC, it represents that if the resonant conversion circuit 110 is now controlled to operate under the resonant frequency, the post-stage inverting circuit 120 cannot normally output the AC output voltage Vout. Therefore, in this case, the second control circuit 140 controls the post-stage inverting circuit 120 to regulate the input voltage thereof according to the normal working voltage VC, such that the DC bus voltage Vbus output by the resonant conversion circuit 110 is regulated to the normal working voltage VC, and the inverter 100 can maintain the rated AC output voltage Vout. In other words, if the best working voltage VF is greater than the normal working voltage VC, the second control circuit 140 controls the inverting circuit 120 to regulate the input DC bus voltage Vbus to the best working voltage VF, and if the best working voltage VF is smaller than or equal to the normal working voltage VC, the second control circuit 140 controls the inverting circuit 120 to regulate the input DC bus voltage Vbus to the normal working voltage VC.

It should be noticed that the operation of comparing the voltage difference by using the second control circuit 140 is only an example, and in other embodiments, the operation of comparing the voltage difference can be implemented by the first control circuit 130, which is not limited by the invention.

Figure 3:
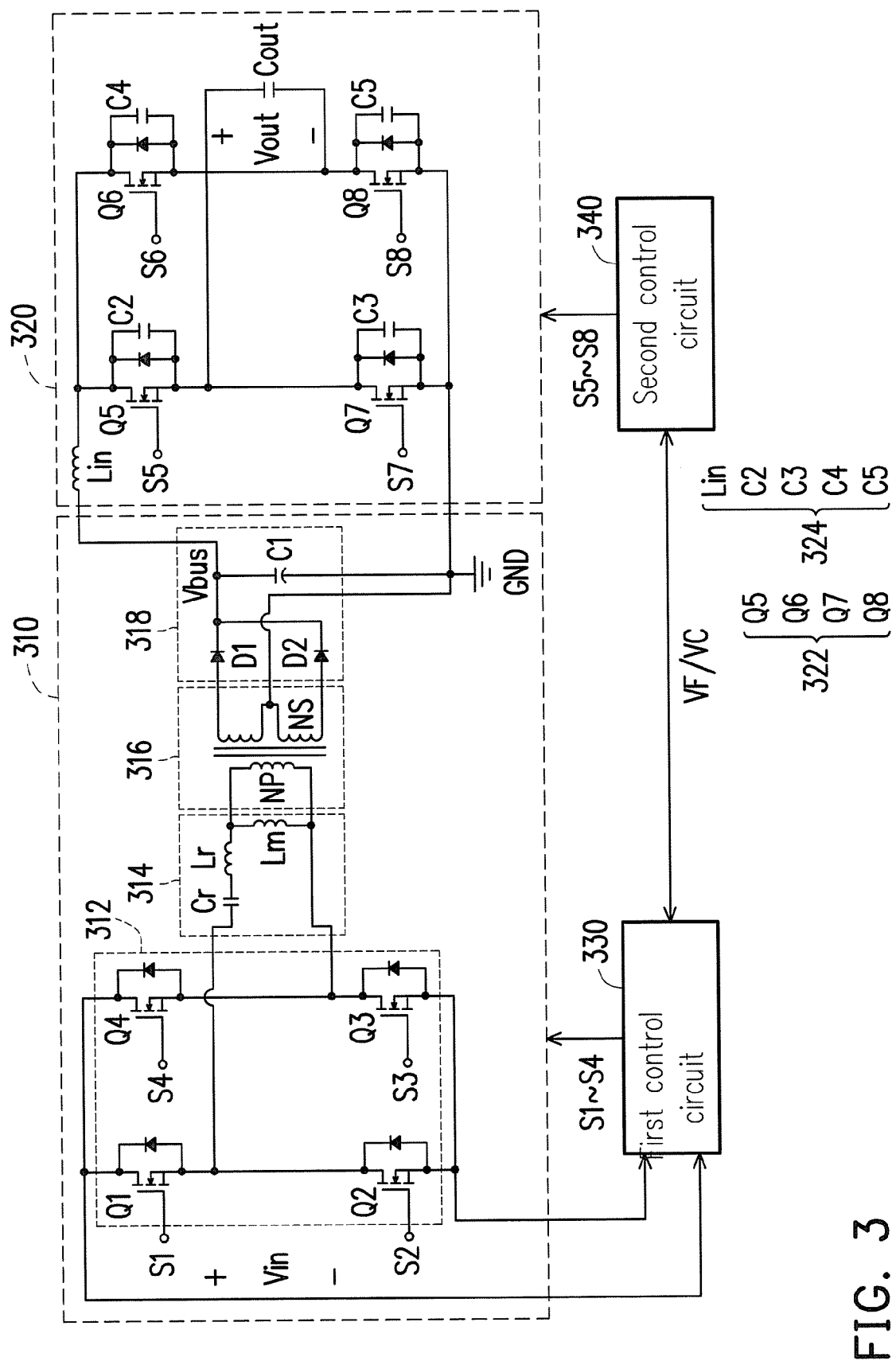
FIG. 3 is a circuit structural schematic diagram of an inverter according to an embodiment of the invention.

An actual circuit structure of an inverter is described below to demonstrate the regulation and operation mechanism of the DC bus voltage of the inverter of the present embodiment, which is shown in FIG. 3. FIG. 3 is a circuit structural schematic diagram of an inverter according to an embodiment of the invention.

Referring to FIG. 3, the inverter 300 includes a resonant conversion circuit 310, an inverting circuit 320, a first control circuit 330 and a second control circuit 340. in the present embodiment, the resonant conversion circuit 310 of the previous stage is, for example, a full-bridge series resonant converter, and the post-stage inverting circuit 320 is, for example, a full-bridge inverter, though the invention is not limited thereto.

In detail, the resonant conversion circuit 310 includes a first switch circuit 312, a first resonant circuit 314, a transformer 316 and a rectifier and filter circuit 318. The first switch circuit 312 is composed of switch transistors Q1-Q4, and the first resonant circuit 314 is composed of a resonant capacitor Cr and resonant inductors Lr and Lm. The switch transistors Q1 and Q2 are connected in series to construct a bridge arm, and the switch transistors Q3 and Q4 are connected in series to construct another bridge arm. Two ends of the two bridge arms receive the DC input voltage Vin.

In the present embodiment, the first control circuit 330 generates control signals S1-S4 used for controlling the switch transistors Q1-Q4, and the switch transistors Q1-Q4 are respectively turned on or turned off in alternation under control of the control signals S1-S4 in a compensation/switching manner, so as to output the DC input voltage Vin to the first resonant circuit 314. The first resonant circuit 314 is charged/discharged in response to switching operations of the switch transistors Q1-Q4, and the transformer 316 produces a corresponding output voltage on a secondary side winding NS thereof in response to a voltage variation on a primary side winding NP thereof. A circuit configuration of the resonant capacitor Cr and the resonant inductors Lr and Lm in the first resonant circuit 314 determines the resonant frequency of the resonant conversion circuit 310. When the first control circuit 318 provides the control signal S1-S4 complied with the resonant frequency to control switching of the switch transistors Q1-Q4, the resonant conversion circuit 310 is operated on the resonant frequency and has the best conversion efficiency.

The rectifier and filter circuit 318, for example, has a circuit structure including diodes D1-D2 and a filter capacitor C1. The diodes D1 and D2 construct a half-bridge rectifier, which rectifies the output of the secondary side winding NS to produce the DC bus voltage Vbus. The filter capacitor C1 is coupled in parallel between a common-polarity terminal and a center-tapped terminal of the secondary side winding NS for filtering a non-DC component of the DC bus voltage Vbus, and provides the DC bus voltage Vbus to the inverting circuit 320.

The inverting circuit 320 includes a second switch circuit 322 and a second resonant circuit 324. The second switch circuit 322 is composed of switch transistors Q5-Q8, and the second resonant circuit 324 is composed of resonant capacitors C2-C5 and a resonant inductor Lin. The switch transistors Q5 and Q6 are connected in series to construct a bridge arm, and the switch transistors Q7 and Q8 are connected in series to construct another bridge arm. The two bridge arms are coupled between the DC bus voltage Vbus and the ground terminal GND.

The second control circuit 340 generates the control signals S5-S8 used for controlling the switch transistors Q5-Q8, and the switch transistors Q5-Q8 are respectively turned on or turned off in alternation under control of the control signals S5-S8 in a compensation/switching manner, so as to convert the DC bus voltage Vbus into the AC output voltage Vout.

Similar to the aforementioned embodiment, the first control circuit 330 regulates the DC input voltage Vin to generate the hysteresis regulation voltage Vh by using the hysteresis control means, and then calculates the best working voltage VF according to the resonant frequency FR of the first resonant circuit 314 and the hysteresis regulation voltage Vh. The second control circuit 340 calculates the normal working voltage VC according to the AC output voltage Vout, and the second control circuit 340 adjusts the control signals S5-S8 according to a comparison result of the best working voltage VF and the normal working voltage VC, and determines to adjust the DC bus voltage Vbus to the best working voltage VF or the normal working voltage VC, so as to make the resonant conversion circuit 310 to operate around the resonant point as far as possible to improve the conversion efficiency of the inverter 300.

Figure 4:
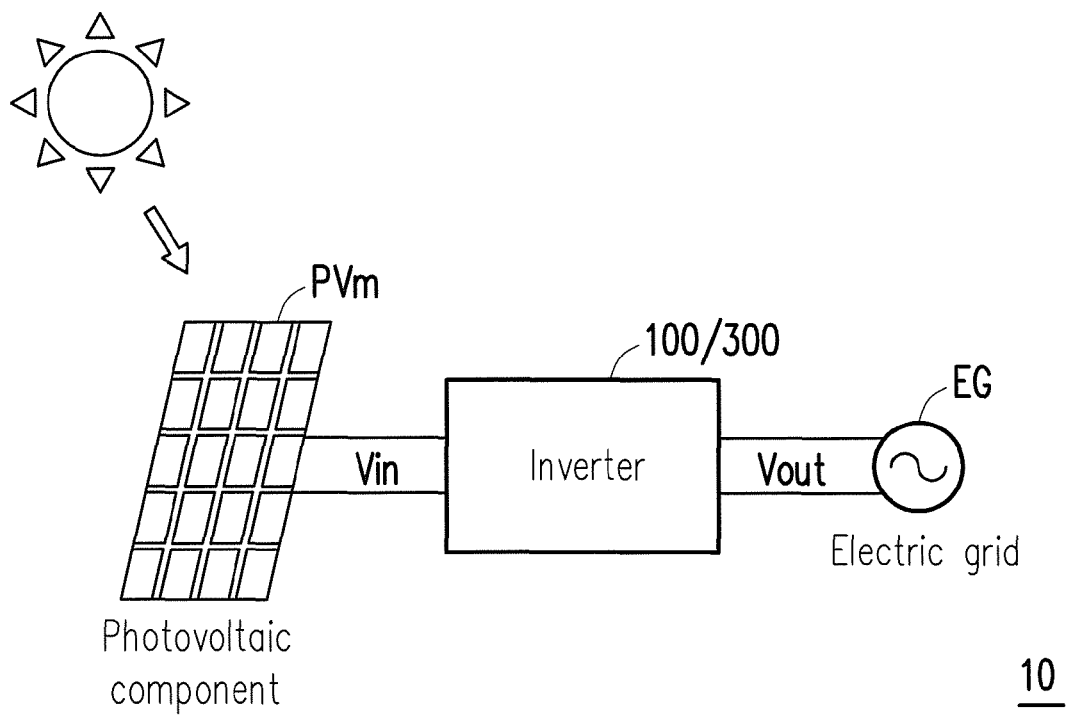
FIG. 4 is a schematic diagram of a photovoltaic grid-connected system.

FIG. 4 is a schematic diagram of a photovoltaic grid-connected system applying the inverter 100/300 of the aforementioned embodiment. Referring to FIG. 4, under the structure of the present embodiment, the inverter 100/300 takes an output of a photovoltaic component PVm as the DC input voltage Vin, and the AC output voltage Vout generated by the inverter 100/300 is provided to a backend electric grid EG for utilization. Therefore, since the DC bus voltage Vbus can be dynamically adjusted according to a state of the inverter 100/300, and the hysteresis control means can be used to mitigate the influence on the DC bus voltage Vbus caused by disturbance of the DC input voltage Vin, the system efficiency of the whole photovoltaic grid-connected system 10 can be effectively improved.

It should be noticed that since the output of the photovoltaic component PVm is only related to a temperature variation, and the temperature variation in the environment is generally a slow process, the DC input voltage Vin of the inverter 100/300 is not frequently varied. Therefore, in the present embodiment, a time interval that the inverter 100/300 regulates the hysteresis regulation voltage Vh according to the DC input voltage Vin is, for example, 200 ms to 500 ms.

Figure 5:
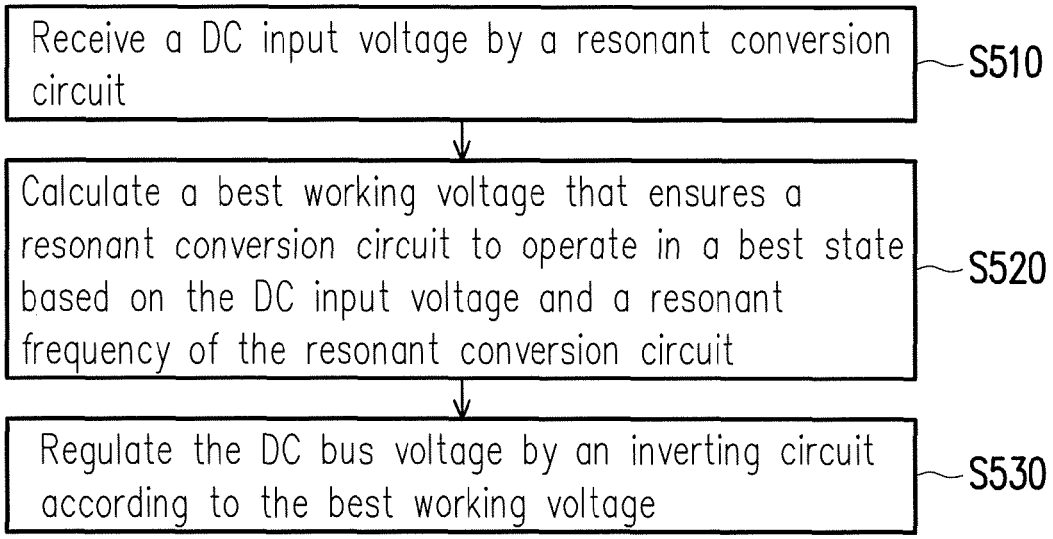
FIG. 5 is a flowchart illustrating a DC bus voltage regulating method of an inverter according to an embodiment of the invention.

FIG. 5 is a flowchart illustrating a DC bus voltage regulating method of an inverter according to an embodiment of the invention. The DC bus voltage regulating method of the present embodiment is adapted to the inverter 100 or 300 of the aforementioned embodiment. Referring to FIG. 5, the DC bus voltage regulating method includes following steps: receiving a DC input voltage by a resonant conversion circuit (for example, the resonant conversion circuit 110 or 310) (step S510); calculating a best working voltage that ensures the resonant conversion circuit to operate in a best state based on the DC input voltage and a resonant frequency of the resonant conversion circuit (for example, the resonant conversion circuit 110 or 310) (step S520); regulating the DC bus voltage by the an inverting circuit (for example, the inverting circuit 120 or 320) according to the best working voltage (S530).

Figure 6:
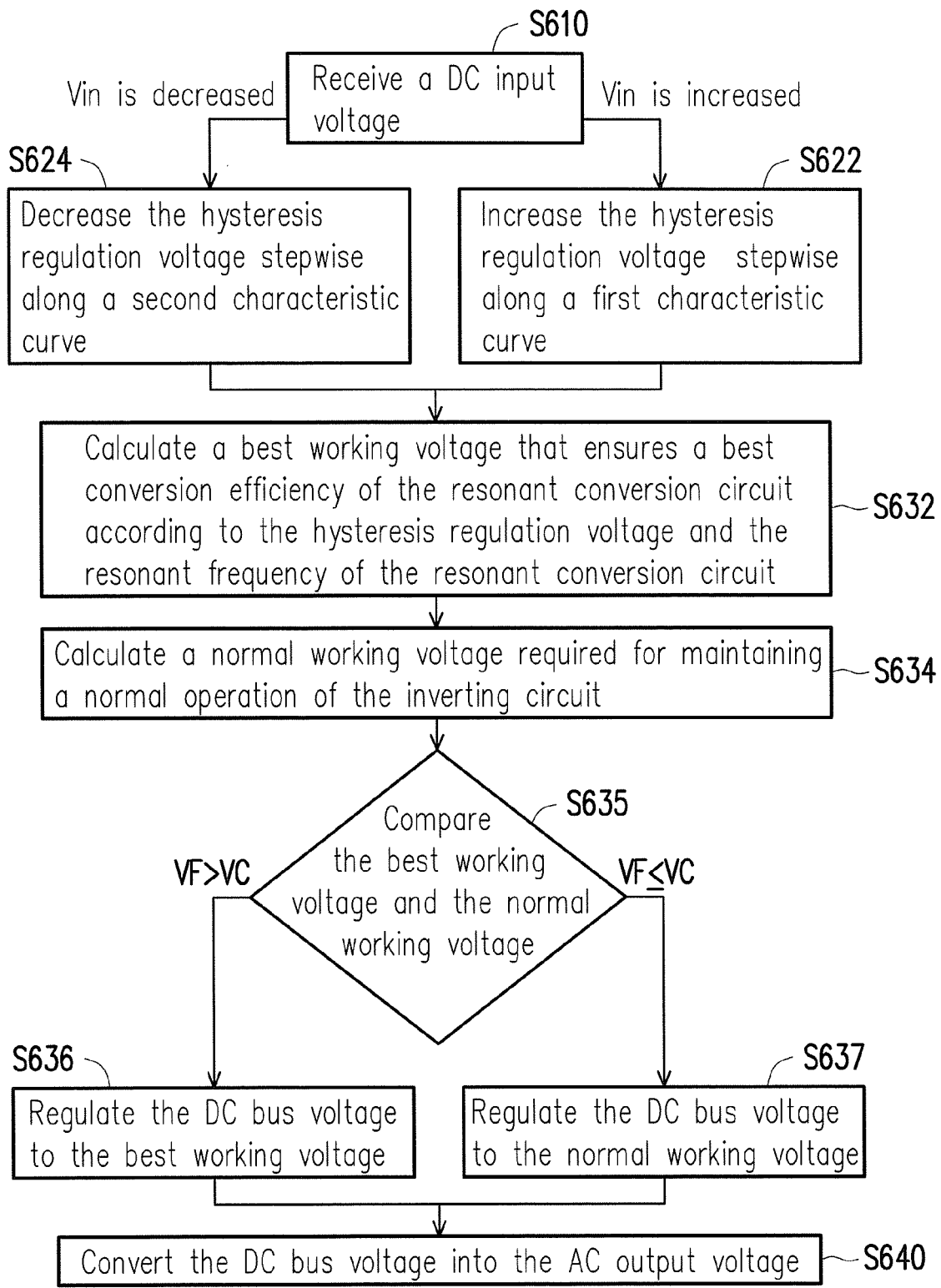
FIG. 6 is a flowchart illustrating a DC bus voltage regulating method of an inverter according to another embodiment of the invention.

More specifically, the DC bus voltage regulating method of FIG. 5 can be implemented by steps of FIG. 6. Referring to FIG. 6, after the step of receiving the DC input voltage Vin by the resonant conversion circuit (step S610), the inverter generates corresponding hysteresis regulation voltages along different characteristic curves according to variation of the DC input voltage Vin. When the DC input voltage Vin is increased, a step S622 is executed, by which the hysteresis regulation voltage is increased stepwise along a first characteristic curve; conversely, when the DC input voltage Vin is decreased, a step S624 is executed, by which the hysteresis regulation voltage is decreased stepwise along a second characteristic curve, where at least one hysteresis loop is formed between the first characteristic curve and the second characteristic curve.

After the hysteresis regulation voltage is generated, the best working voltage VF that ensures a best conversion efficiency of the resonant conversion circuit is calculated according to the hysteresis regulation voltage and the resonant frequency of the resonant conversion circuit (for example, the resonant conversion circuit 110 or 310) (step S632), and a normal working voltage VC required for maintaining a normal operation of the inverting circuit (for example, the inverting circuit 120 or 320) is calculated (S634).

Then, the best working voltage VF and the normal working voltage VC are compared (step S635), and the DC bus voltage is regulated to one of the best working voltage VF and the normal working voltage VC according to a comparison result. When it is determined that the best working voltage VF is greater than the normal working voltage VC, a step S636 is executed, by which the DC bus voltage is regulated to the best working voltage VF; conversely, when the best working voltage VF is smaller than or equal to the normal working voltage VC, a step S637 is executed, by which the DC bus voltage is regulated to the normal working voltage VC. Thereafter, the DC bus voltage is converted into the AC output voltage (step S640).

In summary, the embodiments of the present invention provide an inverter and a DC bus voltage regulating method thereof. The inverter regulates the DC input voltage by using the hysteresis control means, and calculates the best working voltage of the resonant conversion circuit according to the regulated DC input voltage, so as to set the best working voltage as a reference for regulating the DC bus voltage, such that the resonant conversion circuit does not influence the voltage value of the generated DC bus voltage along with disturbance or a tiny variation of the DC input voltage, so as to improve stability of the DC bus voltage. Moreover, the inverter can also select the setting value of the DC bus voltage by comparing the best working voltage and the normal working voltage, such that under a premise of ensuring the post-stage inverting circuit to provide the rated AC output voltage, the resonant conversion circuit can work around a best working point as far as possible, so as to improve the whole conversion efficiency of the inverter.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. An inverter, comprising:
   a resonant conversion circuit, receiving a direct current (DC) input voltage, and converting the DC input voltage into a DC bus voltage;
   an inverting circuit, coupled to the resonant conversion circuit, and configured to convert the DC bus voltage into an alternating current (AC) output voltage;
   a first control circuit, configured to control operations of the resonant conversion circuit, wherein the first control circuit calculates a best working voltage of the resonant conversion circuit based on the DC input voltage and a resonant frequency of the resonant conversion circuit; and
   a second control circuit, configured to control operations of the inverting circuit, wherein the second control circuit receives the best working voltage calculated by the first control circuit, and controls the inverting circuit to regulate the DC bus voltage accordingly,
   the second control circuit detects a magnitude of the AC output voltage, and calculates a normal working voltage required for maintaining a normal operation of the inverting circuit accordingly, and
   one of the first control circuit and the second control circuit compares the best working voltage and the normal working voltage, and the second control circuit controls the inverting circuit to regulate the DC bus voltage to one of the best working voltage and the normal working voltage according to a comparison result.

2. The inverter as claimed in claim 1, wherein the first control circuit regulates the DC input voltage by using a hysteresis control means, and accordingly generates a hysteresis regulation voltage, where the first control circuit calculates the best working voltage according to the hysteresis regulation voltage and a gain of the resonant conversion circuit on the resonant frequency.

3. The inverter as claimed in claim 2, wherein when the DC input voltage is increased, the first control circuit increases the hysteresis regulation voltage stepwise along a first characteristic curve, and when the DC input voltage is decreased, the first control circuit decreases the hysteresis regulation voltage stepwise along a second characteristic curve, wherein at least one hysteresis loop is formed between the first characteristic curve and the second characteristic curve.

4. The inverter as claimed in claim 1, wherein when the best working voltage is greater than the normal working voltage, the second control circuit controls the inverting circuit to regulate the input DC bus voltage to the best working voltage, and when the best working voltage is smaller than or equal to the normal working voltage, the second control circuit controls the inverting circuit to regulate the input DC bus voltage to the normal working voltage.

5. A direct current (DC) bus voltage regulating method for regulating a DC bus voltage generated by an inverter, wherein the inverter comprises a resonant conversion circuit and an inverting circuit, the DC bus voltage regulating method comprising:

receiving a DC input voltage by the resonant conversion circuit;

calculating a best working voltage of the resonant conversion circuit based on the DC input voltage and a resonant frequency of the resonant conversion circuit; and regulating the DC bus voltage by the inverting circuit according to the best working voltage;

detecting the AC output voltage; and calculating a normal working voltage required for maintaining a normal operation of the inverting circuit according to the AC output voltage;

wherein the step of regulating the DC bus voltage according to the best working voltage comprises:

comparing the best working voltage and the normal working voltage; and regulating the DC bus voltage to one of the best working voltage and the normal working voltage according to a comparison result.

6. The DC bus voltage regulating method as claimed in claim 5, wherein the step of calculating the best working voltage of the resonant conversion circuit based on the DC input voltage and the resonant frequency of the resonant conversion circuit comprises:

regulating the DC input voltage by using a hysteresis control means, and accordingly generating a hysteresis regulation voltage; and calculating the best working voltage according to the hysteresis regulation voltage and a gain of the resonant conversion circuit on the resonant frequency.

7. The DC bus voltage regulating method as claimed in claim 6, wherein the step of regulating the DC input voltage by using the hysteresis control means and accordingly generating the hysteresis regulation voltage comprises:

increasing the hysteresis regulation voltage stepwise along a first characteristic curve when the DC input voltage is increased; and decreasing the hysteresis regulation voltage stepwise along a second characteristic curve when the DC input voltage is decreased, wherein at least one hysteresis loop is formed between the first characteristic curve and the second characteristic curve.

8. The DC bus voltage regulating method as claimed in claim 5, wherein the step of regulating the DC bus voltage to one of the best working voltage and the normal working voltage according to the comparison result comprises:

regulating the DC bus voltage to the best working voltage when the best working voltage is greater than the normal working voltage; and regulating the DC bus voltage to the normal working voltage when the best working voltage is smaller than or equal to the normal working voltage.

\* \* \* \* \*